April 9, 1968  J. D. GLOMB  3,376,748
METHOD AND APPARATUS FOR RADIATION PYROMETRY
Filed Oct. 22, 1965
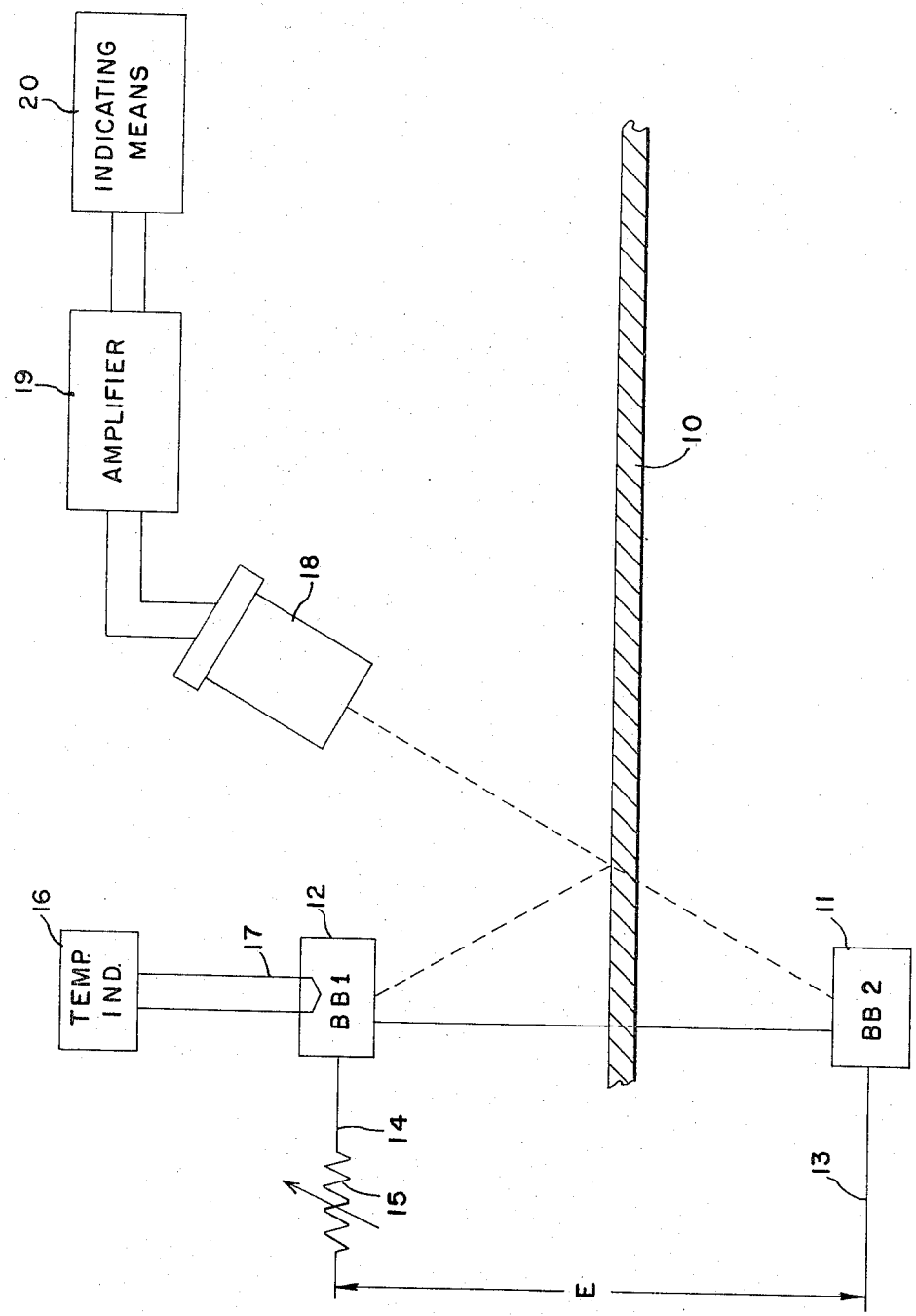
INVENTOR
JOHN D. GLOMB
BY Grist, Lockwood,
Greenawalt & Dewey  ATT'YS.

United States Patent Office 3,376,748
Patented Apr. 9, 1968

3,376,748
METHOD AND APPARATUS FOR RADIATION PYROMETRY
John D. Glomb, South Holland, Ill., assignor to Continental Can Company, Inc., New York, N.Y., a corporation of New York
Filed Oct. 22, 1965, Ser. No. 501,924
4 Claims. (Cl. 73—355)

ABSTRACT OF THE DISCLOSURE

A radiation pyrometer for non-blackbody objects, having 2 standard blackbody sources maintained at the same temperature and placed on either side of the object. A radiation detector is arranged either (1) to receive radiation from the object, radiation from one blackbody reflected by the object, and from the other blackbody transmitted through the object, or (2) to receive radiation only from one of the blackbodies. The temperature of the blackbodies is adjusted until the radiation received in the two instances is the same. The temperature of the object is then given by the temperature of the blackbodies.

---

This invention relates to radiation pyrometry in general, and more specifically is directed towards a general method and apparatus for accurately measuring temperatures of non-blackbody objects.

In the past, temperature measurement of opaque non-blackbody objects has been accomplished in various manners, one of which is described in the patent to Machler, Patent No. 2,837,917, issued June 10, 1958. When the object of interest is partially transparent and partially reflecting, the problem of temperature measurement becomes more complex, since a third variable is introduced, namely transmissivity. One solution to this problem has been proposed in the patent to Wood, Patent No. 3,057,200, issued Oct. 9, 1962, and encompassing a signal comparison circuit to compare outputs received from a system of multiple detectors with a reference body.

The present invention contrasted with the above mentioned prior art is intended as a simplified form of general case solution for ascertaining the temperature or other thermodynamic characteristics of a non-blackbody object, particularly by providing a single simplified radiation measuring system for determining temperature when the object is opaque and reflecting, transparent and non-reflecting, or partially transparent and partially reflecting.

A blackbody is commonly referred to as a perfect radiator and is characterized by the fact that the energy which it emits depends only on the temperature of the blackbody. In comparison, a non-blackbody radiator emits only a fraction of the energy emitted by a perfect radiator or blackbody, the fraction being known as the emissivity of the body. In total radiation pyrometers, emissivity refers to a rather broad spectral range. When the object of interest is an opaque body, and a blackbody is positioned to direct energy on the object, the sum of emissivity plus reflectivity is equal to unity. Obviously, if emissivity were equal to unity, then reflectivity would be zero and the object of interest would have blackbody characteristics. In actual practice, however, non-blackbodies are partial reflectors and thus emissivity is always somewhat less than unity.

In the general case solution proposed by the present invention, the relationship of the optical constants has been extended so that over a temperature wave length region of interest, emissivity plus transmissivity plus reflectivity sum to unity. The present invention is designed to take advantage of this known relation between optical constants irrespective of the emissivity or transmissivity of the object under consideration. For example, it will become apparent that the temperature of a general non-blackbody such as a partially transparent object, gas, or liquid may be readily determined.

In general, this is accomplished by positioning two blackbody equivalents on opposite sides of the object of interest, and by suitable means maintaining the temperature of the blackbody equivalents identical. Additional means is provided to permit adjustment of the blackbodies over a broad range of temperatures such that a detector appropriately placed will recognize blackbody conditions when the equivalent temperature of the object is reached. When the energy in each and all wave lengths which is used to actuate a detector has been made equal to the corresponding energy emitted by a perfect radiator or blackbody at the same temperature as the object under consideration, blackbody temperature measuring conditions will have been attained.

A more complete comprehension of the simplified system of the present invention may be had by a careful consideration and analysis of the objects to be achieved, and a description of the system to accomplish the stated objects.

It is an object of the present invention to provide a simplified temperature measuring system adapted to accurately measure the temperature of an object which is opaque and reflecting, transparent and non-reflecting or partially transparent and partially reflecting.

It is a further object of this invention to provide a radiation system which can be used over a precise narrow wave length and incorporating a single detector for accomplishing temperature measurement of an object having any one of the characteristics stated in the preceding object.

It is a still further object of this invention to provide a system for blackbody pyrometry of general non-blackbodies wherein unlike other radiometry techniques, it is unnecessary in general, either to assume that one or more of the optical constants approach zero, or to obtain information on the values of the optical constants in order to effect temperature measurement.

Further and fuller objects will become readily apparent when reference is made to the accompanying drawing in which is illustrated a schematic diagram of a pyrometer for measuring the temperature of an object which may be opaque and reflecting, or transparent and non-reflecting, or partially transparent and partially reflecting.

The simplified temperature measuring system is illustrated in the accompanying drawing in schematic form. An object, the temperature or thermodynamic characteristic of which is to be determined, is indicated generally at 10 and as pointed out above may be a solid, liquid or gas. For purposes of describing the present system, it will be understood that the object 10 is one that is partially transparent and partially reflecting thus exemplifying the more complex situation for the measuring system since three variables are involved.

On opposite sides of the object 10 are provided a blackbody 11 and blackbody 12 which are at optically equivalent distances from the radiation detector 18. The blackbodies 11 and 12 are suitably positioned so as to direct radiation towards the object 10 along the transmission path indicated by the dotted lines emanating from each. A suitable electrical circuit is provided to energize the blackbodies, being indicated by conductors 13 and 14 respectively, serially connecting the blackbodies 11 and 12 and containing a variable resistor 15 to effect temperature adjustment of the blackbodies 11 and 12. The conductors 13 and 14 supplying electrical energy to the blackbodies 11 and 12 may be connected to a suitable source of power as indicated by the conventional arrow and symbol E. A temperature indicator is identified in block form at 16 which will permit direct reading of the temperature of the blockbodies 11 and 12 at any time, and may include any one of several known types of temperature indicators adapted to be connected to a detecting means such as a thermocouple 17 embedded in the surface of one of the blackbodies.

A detector 18 is positioned on one side of the object 10 under consideration and is suitably positioned so as to view the radiant energy directed through the object 10 from the blackbody 11, the radiation emitted by the object 10 and the radiation reflected from the blackbody 12. A suitable signal processing system such as an amplifier 19 and indicating means 20 may be provided to process the signal received by the detector 18 and display the results.

The detector 18 may be of any known form such as a thermopile, indium antimonide junction, bolometer, lead sulfide cell or the like depending upon the wave length and temperature region of interest. The signal processing system composed of the amplifier 19 and indicating means 20 can likewise be of any suitable known form so long as it provides the requisite sensitivity to distinguish temperature changes. For example, the indicating means 20 may take the form of a voltmeter and be connected directly to the detector if the signal from the detector is of sufficient electrical strength to be directly measurable and the sources of energy distinguishable on calibration.

The temperature of the non-blackbody or object 10 under consideration is determined by adjusting the temperature of the two blackbodies until the detector system 18 recognizes that blackbody conditions are obtained. That is when the detector response on the indicating means 20 which may comprise a scaled meter, galvanometer or the like is equal to that at calibration, for the particular wave length considered, blackbody conditions are existing. When this condition is reached, the temperature of the blockbodies is equal to that of the object of interest and may be directly read from the temperature indicator 16.

If desired, suitable means may be provided to automatically adjust the temperature of the blackbodies. As previously stated, blackbody conditions are attained when the energy in each and all wave lengths utilized in actuating the radiant energy responsive temperature measuring means or detector 18 have been made equal to the corresponding energy emitted by a blackbody at the same temperature of the object under consideration.

The present system relies on a general relation between the optical constants expressed by Kirchoff's Law:

$$\epsilon(\lambda,\tau) + \rho(\lambda,\tau) + t(\lambda,\tau) = 1$$

where $\epsilon(\lambda,\tau)$ = spectral emissivity of the hot object at a temperature T.

$\rho(\lambda,\tau)$ = spectral reflectivity of the hot object at a temperature T.

$t(\lambda,\tau)$ = spectral transmissivity of the hot object at a temperature T.

$T$ = hot object temperature in ° Kelvin.

In calibrating the present system, the detector 18 is so disposed that it may alternately view the energy emitted from one of the blackbodies directly and then the emitted, reflected, and transmitted energy indicated by the dotted lines in FIG. 1. One manner of accomplishing calibration includes removal of the object 10 to permit the detector 18 to view the radiation from the blackbody 11 directly. The object may then be inserted in the transmission path. These steps are repeated until the indicating means 20 identifies the signal response from alternate viewings to be equal, at which time the equation wherein the transmissivity, reflectivity and emissivity sum to unity is satisfied, and blackbody conditions obtained. As expected, at this time the temperature of the object 10 under consideration is equal to the indicated temperature of the blackbodies 11 and 12.

Assume for example, in the temperature measuring system of FIG. 1 that after blackbody conditions have been attained the object temperature drops to a temperature T and the blackbodies remain at a temperature greater than T. Assume further that the detector is only responsive to energy falling between a 1 to 5 microns making it in essence a band limited system. From this example, it can be appreciated that the present system by using a single detector permits any desired wave length to be selected in order to obtain maximum response over the temperature region of interest. In particular, it has been found highly desirable to select wave lengths which are appropriate to reduce the sensitivity to fluctuations in the transmission path characteristics while obtaining increased sensitivity in the temperature range under consideration. Most often, the temperature wave length region may be chosen so as to be substantially unaffected by the existing extraneous conditions at the point of detector viewing while staying within a limited band of wave lengths to obtain a known relation between temperature and radiant intensity.

In a laboratory application of radiation measuring systems, the undesirable conditions ordinarily experienced in practical application are oftentimes not capable of reproduction. For example, in practice, the measuring system may be used to measure the temperature of a hot sheet of glass as it issues from a rolling mill, or a glob of glass prior to forming. The emissivity and transmissivity as well as the reflectivity of such an object may change rapidly due to imperfections or impurities in the material, changes in surface conditions. Nonetheless, the present system, which does not rely on any one of the terms to remain constant, will be unaffected except in cases of actual temperature change.

The present system simplifies the placement of blackbodies and the detector relative to the object under consideration, as well as permitting a simplified method of selecting the most appropriate wave length to minimize any adverse affect on sensitivity of fluctuations or disturbances in the transmission path which is oftentimes filled with water vapor, dust, smoke, dirt and the like. Selection of a wave length where changes in radiant intensity may be of the order of the eighth power of changes in temperature, and obtaining the most appropriate for existing conditions is made with un -equaled ease by the present system which utilizes a single detector. This eliminates the necessity and oftentimes difficult task of matching detectors as is normally required in systems utilizing a multiple detector arrangement. As a corollary, in those instances where it is desirable to filter the radiant energy received at the detector, the necessity of filter matching is also obviated.

It is obvious from the foregoing that if the object under consideration should exhibit an emissivity factor which approaches or nearly equals zero, one of the blackbodies may be omitted. Some glasses over a wide range of wave lengths will not absorb and therefore not emit radiation. The same holds true for gases outside their molecular wave length, as well as narrow and wide band regions in certain plastics. In these cases, if it can be shown that over the wave length-temperature region of interest, reflectively and transmissivity bear a known temperature-dependant relation, it is also possible in principle to eliminate one of the two blackbody sources as noted above.

Assume, for example, that the emissivity factor in the equation given above is equal to zero and reflectivity bears a known relation to transmissivity, only a reflection or a transmisson source need be employed. Once the blackbody temperature is known and the detector output is calibrated, the transmissivity factor may be determined. Knowing the transmissivity factor and the functional relation between transmissivity and reflectivity, it is possible to duplicate the effect of the second blackbody by adding an amount to detector output equivalent to that which would be provided by the reflection source. When the modified detector output indicates a temperature identical to the known blackbody temperature, the indicated temperature is that of the object as noted above.

After having considered the foregoing discussion it will be immediately obvious to those skilled in the art that numerous departures may be made without departing from the spirit and scope of the invention. Therefore, it is intended that only said limitations be imposed as fall within the spirit and scope of the appended claims.

I claim:

1. An apparatus for measuring the temperature of a radiant object comprising a first blackbody positioned on one side of said radiant object and a second blackbody on the opposite side of said radiant object, means to adjust the temperature of said blackbodies simultaneously for maintaining the temperature thereof substantially equal, means to directly measure the temperature of one of said blackbodies, and detector means positioned on said one side of said radiant object to simultaneously view the reflected energy of said first blackbody, the emitted energy of said radiant object and the transmitted energy of said second blackbody, whereby when blackbody conditions are attained at said detector the object temperature is equal to the temperature of said blackbodies which may be directly read.

2. In a radiation pyrometer system for determining the temperature of a hot non-blackbody object, the provision of a first blackbody positioned on one side of the hot non-black body object, a second blackbody positioned on the opposite side of said hot non-blackbody object, detector means positioned on one side of said non-blackbody object, said detector means being appropriately placed relative to each of said blackbodies for viewing the energy transmitted through said hot object by the blackbody positioned on the opposite side thereof while simultaneously viewing the emitted energy of said object and the reflected energy of said blackbody on the same side of said object as said detector means, and means for simultaneously adjusting the temperature of said blackbodies to the selected temperature region of interest, and means to indicate the temperature of said blackbodies whereby the temperature of said hot object will be equal to that of said blackbodies when blackbody conditions are recognized at said detector.

3. An apparatus for measuring the temperature of a radiant non-blackbody object which is partially transparent and partially reflecting comprising a first perfect radiator mounted on one side of said radiant object in close proximity thereto, a second perfect radiator mounted on the opposite side of said non-blackbody object in close proximity thereto, detector means positioned on one side of said object to view the radiant energy emitted from said object while simultaneously viewing the energy reflected from and passing through said radiant object from said blackbodies, means permitting simultaneous adjustment of said blackbodies over a selected temperature range to calibrate said apparatus so that blackbody conditions will be recognized at said detector when said object and said blackbodies are at equal temperatures and means for indicating the temperature of said blackbodies.

4. A method of determining the temperature of a hot non-blackbody object comprising the steps of placing a first blackbody on one side of said hot non-blackbody object to direct energy radiated thereby on said object, placing a second blackbody on the opposite side of said hot non-blackbody object, selectively positioning a detecting means responsive within a pre-selected band of wave lengths on said one side of said hot non-blackbody object to view energy emitted from said hot non-blackbody object while simultaneously viewing the energy reflected by said object from said first blackbody and the energy transmitted from said second blackbody through said hot non-blackbody object, calibrating said detecting means by removing said hot non-blackbody object and viewing said second blackbody directly, inserting said hot non-blackbody object between said second blackbody and said detector, comparing the output of said detecting means, and adjusting the temperature of said first and second blackbody objects until the detecting means output viewing hot non-blackbody is equal to the output when said hot non-blackbody object is removed whereby blackbody conditions obtain and said object temperature equals said blackbody temperature which is known.

References Cited

UNITED STATES PATENTS

| | | | |
|---|---|---|---|
| 2,737,809 | 3/1956 | Fastie | 73—355 |
| 2,800,023 | 7/1957 | Obermaier | 73—355 |
| 2,837,917 | 6/1958 | Machler | 73—355 |
| 2,846,882 | 8/1958 | Gray | 73—255 |
| 2,912,862 | 11/1959 | Machler et al. | 73—355 |
| 2,963,910 | 12/1960 | Astheimer | 73—355 |
| 3,057,200 | 10/1962 | Wood | 73—355 |

OTHER REFERENCES

Bernard, B.: Determining Emissivity. In Instruments & Control Systems, vol. 37, No. 5, May 1964, pp. 87–89, copy in 73-355.

LOUIS R. PRINCE, *Primary Examiner.*

F. SHOON, *Assistant Examiner.*